Oct. 10, 1939.　　　T. J. MICKOW　　　2,175,907
WOODWORKING MACHINE
Filed Feb. 4, 1938　　　2 Sheets-Sheet 1

Inventor
Theodore J. Mickow
By Anus, Thien, Olsen & Mechlenburger
Attys.

Oct. 10, 1939.  T. J. MICKOW  2,175,907
WOODWORKING MACHINE
Filed Feb. 4, 1938  2 Sheets-Sheet 2
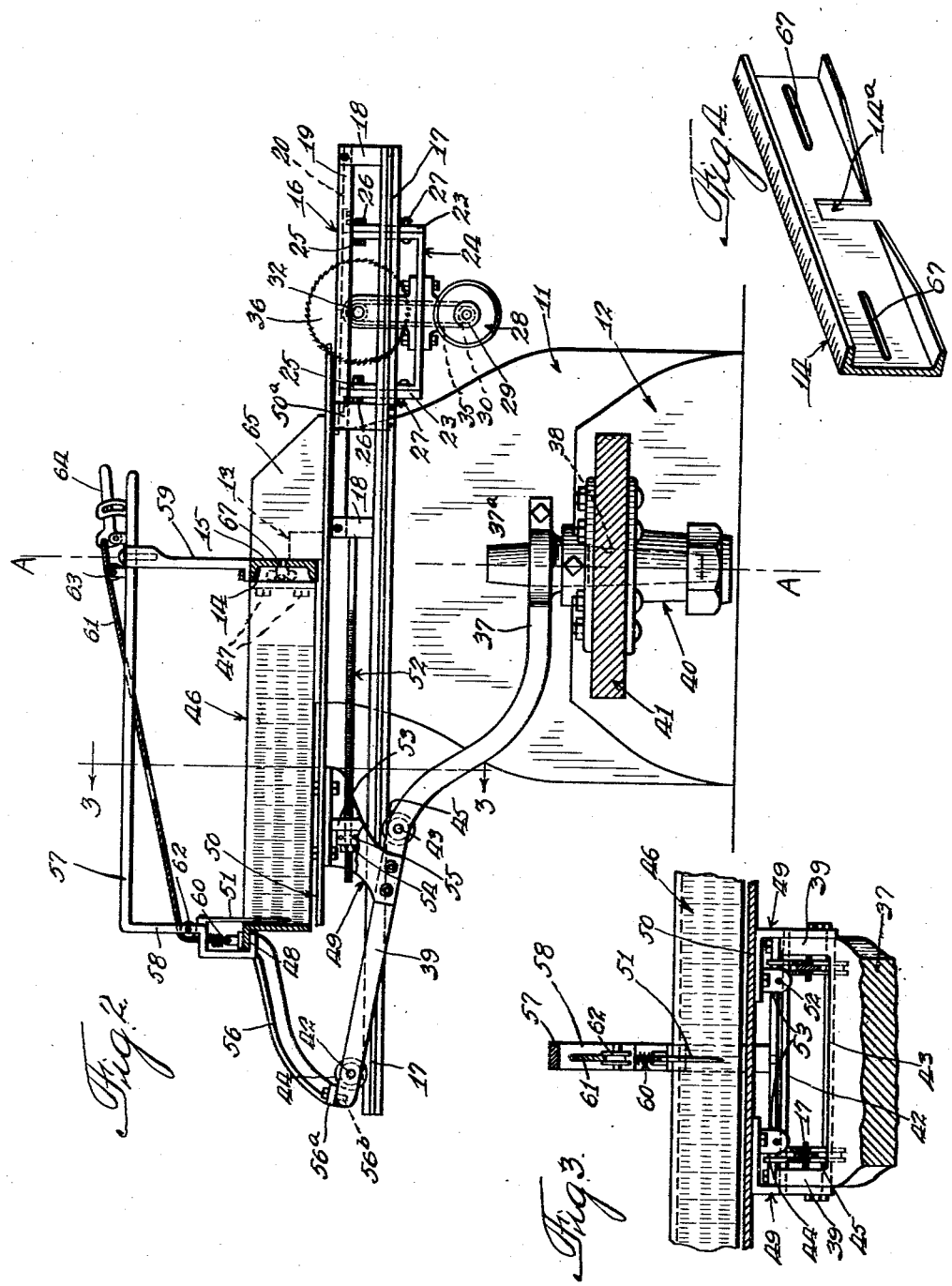
Inventor
Theodore J. Mickow Patented Oct. 10, 1939

2,175,907

UNITED STATES PATENT OFFICE 2,175,907

WOODWORKING MACHINE

Theodore J. Mickow, Hamlet, Ind.

Application February 4, 1938, Serial No. 188,631

3 Claims. (Cl. 144—3)

This invention relates to a woodworking machine and has special reference to a machine for making various regular and irregular side and end cuts in rafters, studding and the like, and also which may readily be transformed into a machine for joining, sanding and other woodworking operations.

More particularly, this invention relates to a woodworking machine comprising a stationary table for supporting the work together with a cross bar having a vertically extending face for aligning the work on a table and a carriage for supporting a tool including a laterally extending track, there being a rotatable support including a trunnion and a guideway for slidably receiving the track to support the carriage in its positions of movement and a bearing for receiving the trunnion of the rotatable support wherein the arrangement is such that an extension of the axis of the bearing and trunnion lies in the plane of the vertically extending face of the cross bar.

In the specific embodiment disclosed in the drawings, the rotatable support has a pair of spaced arms extending from the trunnion with a pair of grooved wheels rotatably mounted on each of the arms, one of the wheels being disposed above and the other below each of the tracks to form guideways for slidably receiving the tracks to support the carriage in its positions of movement.

Also, in order to indicate positions of rotatable adjustment between the rotatable support and a stationary table for supporting the work, a protractor is fixed to the cross support on the stationary table with an indicator movable with a foldable table top carried by the rotatable support cooperating with the graduations of the protractor. Further, frictional means are carried by the rotatable support for engaging the fixed protractor to releasably hold the rotatable support in various positions of fixed adjustment with respect to the stationary table.

The machine of the present invention has for its purpose to provide a simple and efficient means for making cuts in wood such as pitch cuts on rafters, gable cuts, eave cuts, studding notches, mortice and tenon cuts, and also for cutting hip or valley rafters and jack rafters where there are two angles to be cut at once, the saw being tilted and the rotatable support turned to the proper adjustment. The woodworking machine is also capable of making a rip cut as well as a cross cut in a board.

It is also possible, by means of the specific construction of the present invention, to fold the table and substitute for the saw a jointer, sander, or other woodworking apparatus, so that the machine contemplates general use in woodworking.

The tool shown in the drawings as being employed in the woodworking machine is a circular saw having movement across the machine, the work being held against a cross bar with the circular saw on one side thereof, the carriage holding the saw being pulled toward the operator and through the work either to a definite cut as determined by a stop mechanism or through the entire piece of work to its forward limit of movement. By reason of the adjustable stop predetermining the limit of movement in one direction, various cuts are possible in woodworking with the least amount of skill being required in its operation while at the same time a great convenience is had in handling in a minimum of time.

By reason of the operating mechanism of the machine being rotatably supported, the piece of work may rest on the stationary table and the saw may make a definite predetermined cut at any desired angle at any predetermined point along the length of the piece. The cut to be made may be predetermined over the length of the piece by means of an adjustable end stop, the end stop being cooperatively associated with graduations on the cross bar against which the work is engaged.

One of the objects of this invention is to provide a woodworking machine of the type indicated above which is simple in construction, is efficient and economical in operation, and is comparatively inexpensive to manufacture.

Another object of this invention is to provide a woodworking machine of the character noted above in which various regular and irregular side and end cuts for rafters, gables and the like may be made simply and expeditiously.

It is also an object of this invention to provide a woodworking machine of the type hereinabove noted in which the elements thereof may be readily assembled and disassembled to provide a portable machine.

Again, it is an object of this invention to provide a woodworking machine of the character hereinbefore mentioned wherein the tool may be readily changed and other woodworking tools used.

Other objects and advantages of this invention will hereinafter be more particularly pointed out and for a more complete understanding of the characteristic features of this invention, reference may now be had to the following description when taken together with the accompanying drawings, in which latter:

Fig. 2 is a vertical sectional view taken on the line 2—2 of Fig. 1;

Fig. 3 is a fragmentary sectional view taken on the line 3—3 of Fig. 2;

Fig. 4 is a perspective view of a fragmental portion of the cross bar.

Figure 1:
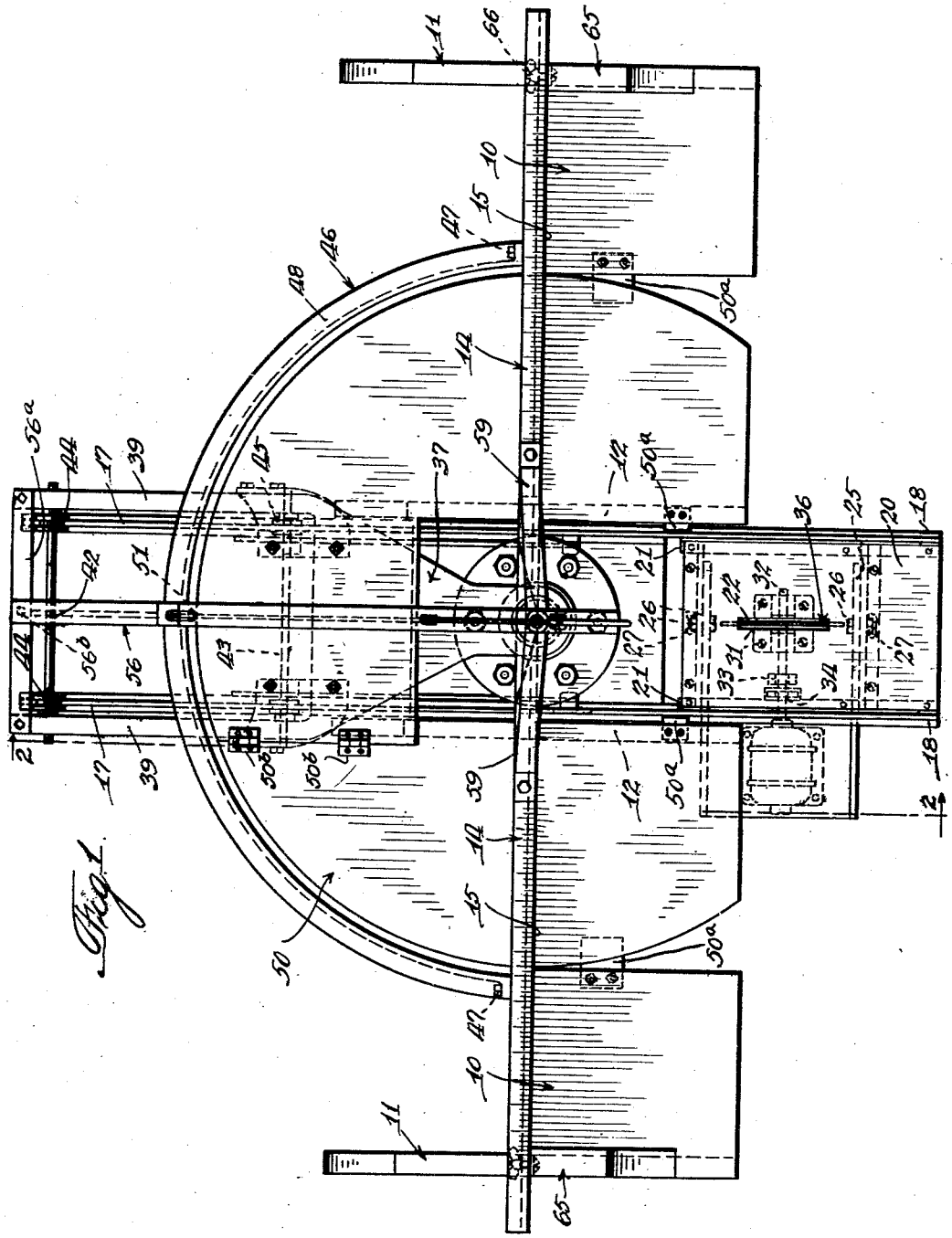
Figure 1 is a top plan view partially in section of a woodworking machine incorporating the features of this invention.

Referring now more particularly to the drawings, the woodworking machine incorporating the features of this invention as disclosed in the drawings comprises a stationary table 10 supported on the spaced end supports 11. Intermediate supports 12 are disposed between the end supports for holding the rotatable support, as will hereinafter be more fully pointed out. The end and intermediate supports rest, of course, on a supporting surface and the end supports fix the table 10 in a stationary relation therewith, the table 10 being therefore referred to as a stationary table for supporting the work indicated by the dotted lines 13.

A cross bar 14 having vertically extending faces 15 extends across and is detachably supported by the end supports 11. The cross bar is preferably provided with pins depending from the lower face thereof for engagement with apertures in the end supports or in the table so that the cross bar may readily be lifted from the table. The cross bar 14 may preferably be graduated across its face 15 and on its upper flange and is preferably formed of channel cross section of either wood or metal. A slot 14a, as shown more particularly in Fig. 4 of the drawings, is provided in the cross bar 14 for permitting the passage of the woodworking tool therethrough and the lower flange of the channel is cut away angularly on each side of the slot to permit the tool to pass through the cross bar at an angle.

A carriage 16 for supporting a tool is mounted to move transversely across the machine, the carriage comprising a pair of laterally spaced tracks 17 having uprights 18 secured thereto at one end interiorly thereof for supporting rails 19. A plate 20 is supported on angle irons 21 fixed to the spaced rails 19 and has a rectangular-shaped opening 22 disposed substantially centrally of its width and intermediate the ends thereof. A pair of end plates 23 are secured to and depend from the plate 20 for receiving therebetween a U-shaped bracket 24. The arms 25 of the bracket 24 are provided with vertically spaced apertures, the upper apertures registering with an aperture in the plates 23 for receiving bolts 26 for the pivotal support thereof and the lower apertures registering with arcuate slots in the plates 23 for receiving bolts and the wing nuts 27, the slots extending about a radius described from the upper apertures. The bracket 24, by means of the construction just described, is permitted to pivot, and a fixed position thereof is retained after adjustment by the wing nuts 27.

The bracket 24 supports a motor 28 on the under surface thereof, the motor having a motor shaft 29 for supporting a driving pinion 30 fixedly mounted thereon to rotate therewith. Spaced standards 31 are mounted on the upper surface of the bracket 24 and are provided with bearing portions for receiving a driven shaft 32. An extending end of the driven shaft 32 is supported by a standard 33 and, in turn, supports a driven pinion 34 fixedly mounted thereon to rotate therewith. The driving pinion 30 and driven pinion 34 are connected by means of a belt or chain 35 so that power from the motor 28 is communicated to the driven shaft 32. In the illustration of the drawings, a circular saw 36 is fixedly mounted on the driven shaft 32 and is driven by the motor 28.

The blade of the saw 36 extends through the aperture 22 of the plate 20 and the carriage for supporting the saw is so adjusted that the saw occupies a substantially vertical position. However, when it is desired to tilt the blade of the saw at an angle, the thumb screws 27 are loosened and the bracket 24 swung to any desired position of angular adjustment, the axis of the blade of the saw being substantially in the plane of the pivot of the support 24 in both horizontal directions.

A rotatable support 37 comprising a trunnion 38, having spaced arms 39 extending therefrom in detachable engagement therewith, is supported in a bearing 40, the bearing 40, in turn, being mounted on a base 41 which extends between and is supported by the intermediate supports 12. The bearing 40 is preferably of the roller bearing type and may be, for example, such a bearing as is employed in automotive vehicles or the like. The support 37 has a split collar 37a with flanges extending from the collar for receiving a bolt for tightening the collar about the trunnion. The rotatable support 37 may be readily removed from the trunnion for expedient assembly and disassembly of the machine.

The spaced arms 39 are provided with apertures for receiving shafts 42 and 43 upon which are mounted pairs of spaced grooved wheels 44 and 45, respectively. The grooved wheels 44 and 45 cooperate to form guideways for receiving the spaced tracks 17 in slidable engagement therewith. The pairs of wheels 45 are disposed below the spaced tracks 17 and the pairs of wheels 44 are disposed above the tracks 17, the carriage, being on one end of the tracks, is thus held in a position for movement across the machine preferably parallel with the supporting surface.

In order to obtain an efficient operation of the machine and for accurate control of the cut to be made in the piece of work, the common axis of the trunnion 38 and the bearing 40 lies in the plane of the vertically extending face 15 of the cross bar 14 as indicated by the dot-dash line A—A, against which face the work is rested for the cutting operation. Irrespective of the position of rotatable adjustment of the support 37 the saw will enter the piece at exactly the same point so that no indirect measurement need be calculated, the measurement on the cross bar against which the piece abuts being directly applicable to the piece.

A protractor 46 is fixedly secured to the cross support 14 as by means of bolts 47 or like securing members, the protractor being preferably in the form of a semi-circular band having a flange 48 extending outwardly from the upper peripheral edge. The inner face of the band of the protractor is preferably set off with various graduations in degrees, inches, pitches and the like, for properly determining the rotatable adjustment of the support 37.

A pair of spaced brackets 49 are fixedly mounted on the arms 39 of the rotatable support 37 as shown more particularly in Figs. 2 and 3, the brackets 49 supporting a table top 50, the latter being bolted or otherwise secured thereto. The periphery of the table top 50 is curved to lie within the confines of the protractor 46. The table top 50 being mounted fixedly on the rotatable support turns therewith and the rotatable support is measured in its movement on the scale of the protractor which latter is stationary with the table 10. The table top 50 is supported at the operating end thereof by the brackets 50a resting on the tracks 17 and supported from the table 10.

In order to predetermine the limit of movement of the carriage and thereby the tool supported therein, a pair of rods 52 is fixed to the end of the carriage and extends therefrom in the direction of the rails for engagement with apertures in the ears 53 secured to and depending from an upper surface of the bracket 49. The rods 52 are threaded over a substantial portion thereof and carry on their ends bolts 54 which are threaded along the rods to such an extent as to limit the movement of the carriage when the nuts engage the collars 55 fixed adjacent the ears 53. Should, for example, the saw blade pass only part way into the piece 13 to be cut, the movement of the saw blade into the piece is determined by the position of the nut 54 on the rod 52. In the instance of the drawings the saw is extended substantially to the limit of its forward movement through the work and prior to its being used for cutting again the carriage must be returned to the other side of the cross bar 14 and the work piece moved into position against the face 15 of the cross bar 14.

In order to releasably fix the position of rotatable adjustment between the support 37 and the stationary table 10, a standard 56 extends upwardly from a cross bar 56a and rests detachably thereon, the cross bar being held against lateral displacement by means of a pin 56b depending from the standard for engagement with an aperture in the cross bar. A cross piece 57 is fixedly secured to the top of the standard 56, one end thereof being bent downwardly into a depending portion 58 and the other end being pivotally supported on a standard 59, the axis of the pivot being on the line A—A previously described. A pointer 51 extends from the depending portion 58 for cooperation with the scale of the protractor to indicate positions of rotatable adjustment between the rotatable support 38 and the stationary table 10.

The depending end 58 of the cross piece 57 has a U-shaped portion through which extends a spring pressed plunger 60 controlled by a cord 61 or the like, extending over pulleys 62 and 63. One end of the cord 61 is attached to the plunger and the other end is secured to a fulcrum lever 64 pivotally mounted on the pivoted end of the cross piece 57. One leg of the U-shaped portion engages the underneath surface of the flange 48, the upper surface of the flange being engaged by the spring pressed plunger 60 so that in a normal condition of use a frictional engagement is obtained between the protractor 46 and the rotatable support 37. When it is desired to adjust the position of the rotatable support with respect to the protractor, the fulcrum lever 64 is pivoted to move the plunger against the compression of the spring and away from its engagement with the flange 48 whereby a free rotation of the rotatable support 37 is obtained. A release of the fulcrum lever 64 permits the compression spring to operate to move the plunger into engagement with the flange.

An adjustable end piece 65 is preferably provided for each end of the table 10 in order to predetermine the length of the pieces operated upon or to determine the position of cut relative length of the piece. The end piece 65 may be moved lengthwise of the cross bar 14 and is preferably secured thereto as by means of wing nuts 66, the bolts thereof passing through a slot or a series of slots 67 in the face of the cross bar.

When it is desired to employ the machine for taking a rip cut, the cross support 14 and the protractor 46, secured thereto, is lifted from the table together with the standard 56 and associated frictional elements. These members merely rest on the stationary table with pins preventing lateral displacement thereof. When the machine is to be employed in planing or sanding, one portion of the table top 50 is foldable on the hinges 50b to rest over the other portion thereof so that a clear space is provided on one side of the machine. In disassembling the machine for transportation or storage, a mere loosening of the bolt of the collar 37a permits removal of the rotary support 37 and all of the units are freed for individual handling.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. In a woodworking machine, spaced stationary supports having a divided work supporting surface supported thereon, a cross bar having a face for aligning the work on said supporting surface, a carriage for supporting a tool, said carriage forming a platform extending between the divided portions of said divided work supporting surface and having a laterally extending track fixed thereto and extending outwardly therefrom below said work supporting surface, a rotatable support including a trunnion and a guideway, said track being supported by and slidable along said guideway in its positions of movement to permit said carriage and said track to extend beyond the confines of said work supporting surface, and a bearing for receiving the trunnion of said rotatable support, an extension of the axis of said bearing and said trunnion lying in the plane of the vertically extending face of said cross bar.

2. In a woodworking machine, spaced stationary supports having a divided work supporting surface supported thereon, a cross bar having a face for aligning the work on said supporting surface, a carriage for supporting a tool and forming a platform extending between the divided portions of said divided work supporting surface, said carriage having a laterally extending track fixed thereto and extending outwardly therefrom below said work supporting surface, a rotatable support including a trunnion and a guideway, said track being supported by and slidable along said guideway in its positions of movement to permit said carriage and said track to extend beyond the confines of said work supporting surface, a bearing for receiving the trunnion of said rotatable support, an extension of the axis of said bearing and said trunnion lying in the plane of the vertically extending face of said cross bar, a graduated protractor fixed to said cross bar and supported thereby, and means carried by said rotatable support co-operating with the graduations of said protractor to indicate positions of rotatable adjustment.

3. In a woodworking machine, spaced stationary supports having a divided work supporting surface supported thereon, a cross bar having a face for aligning the work on said supporting surface, a carriage for supporting a tool and a power unit therefor including a horizontally extending platform having spaced tracks extending laterally outwardly therefrom and fixed thereto, said platform extending between the divided portions of said divided work supporting surface, a rotatable support including a trunnion and a guideway, said carriage and tracks being disposed below the work supporting surface with said track being supported by and slidable along said guideway in its position of movement to permit said carriage and track to extend beyond the confines of said work supporting surface, and a bearing for receiving the trunnion of said rotatable support, an extension of the axis of said trunnion and said bearing lying in the plane of the vertically extending face of said cross bar.

THEODORE J. MICKOW.